United States Patent

(12)

Harada

(10) Patent No.: US 6,333,393 B1
(45) Date of Patent: Dec. 25, 2001

(54) AROMATIC POLYESTER AND MOLDED ARTICLE USING THE SAME

(75) Inventor: Hiroshi Harada, Minoo (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/627,235

(22) Filed: Jul. 27, 2000

(30) Foreign Application Priority Data

Aug. 6, 1999 (JP) .................................................. 11-223914

(51) Int. Cl.$^7$ .................................................. C08G 63/02
(52) U.S. Cl. .......................... 528/193; 528/176; 528/194; 528/206; 528/212; 528/219; 528/302; 528/308; 528/308.6; 524/401
(58) Field of Search .................... 528/176, 193, 528/194, 206, 212, 219, 302, 308, 308.6; 524/401

(56) References Cited

U.S. PATENT DOCUMENTS

| | | |
|---|---|---|
| 4,563,508 | 1/1986 | Cottis et al. . |
| 4,603,190 | 7/1986 | Dicke et al. . |
| 4,751,128 | 6/1988 | Portugall et al. . |
| 5,278,278 | 1/1994 | Okamoto et al. . |
| 5,767,223 | 6/1998 | Yamada et al. . |

FOREIGN PATENT DOCUMENTS

| | | |
|---|---|---|
| 0 503 106 A1 | 3/1993 | (EP) . |
| 0 593 324 A1 | 4/1994 | (EP) . |
| 0 621 317 A1 | 10/1994 | (EP) . |
| 0 648 814 A1 | 4/1995 | (EP) . |
| WO89/04501 | 5/1989 | (WO) . |

*Primary Examiner*—Samuel A. Acquah
(74) *Attorney, Agent, or Firm*—Sughrue, Mion, Zinn, Macpeak & Seas, PLLC

(57) ABSTRACT

An aromatic polyester having the following structural units, (1), (2), (3), (4) and (5), wherein the amount of the structural unit (1) is 30 to 50% based on the total of the all structural units, (2)/(3) is more than 2.78 and smaller than 4, (4)/(5) is more than 1.0 and smaller than 1.5, and $\{(2)+(3)\}/\{(4)+(5)\}$ is from 0.9 to 1.1:

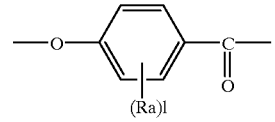

(1)

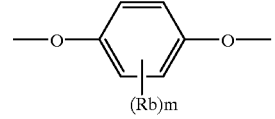

(2)

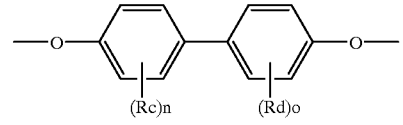

(3)

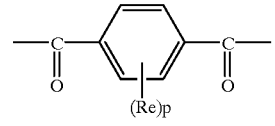

(4)

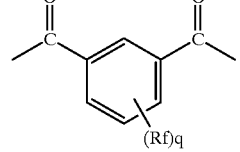

(5)

wherein Ra, Rb, Rc, Rd, Re and Rf each independently represents a lower alkyl group, lower alkoxy group, phenoxy group, phenyl group or halogen atom, and l, m, n, o, p and q each independently represents an integer from 0 to 3, is provided; and the aromatic polyester has excellent molding property and a molded article made from this polyester has excellent soldering temperature resistance and rigidity.

5 Claims, No Drawings

AROMATIC POLYESTER AND MOLDED ARTICLE USING THE SAME

BACKGROUND OF THE INVENTION

The present invention relates to an aromatic polyester having the following structural units (1) to (5) and a molded article using the aromatic polyester.

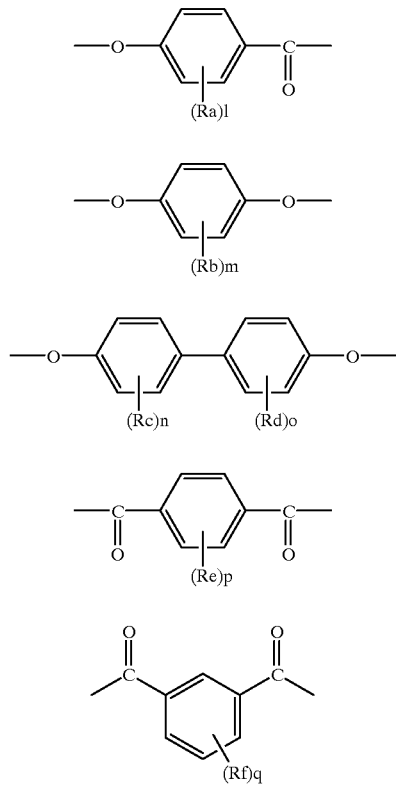

wherein Ra, Rb, Rc, Rd, Re and Rf each independently represents a lower alkyl group, lower alkoxy group, phenoxy group, phenyl group or halogen atom, and n represents an integer from 0 to 3.

Conventionally, aromatic polyesters having the above-described structural units (1), (2), (3), (4) and (5) have been known. Particularly, aromatic polyesters which contain industrially easily available structural unit (2) more than diol structural unit (3) are proposed. For example, aromatic polyesters have been proposed in which the ratio of (2)/(3) (=molar ratio of (2) to (3), that is, ratio of number of unit (2) to number of unit (3) in the aromatic polyester. Hereinafter in this specification, each (1), (2), (3), (4) and (5) sometimes refer the structural units (1), (2), (3), (4) and (5), respectively, and the molar ratio of a unit to another unit is indicated by using b "/".) is 1 or more and 12 or smaller, and (4)/(5) is 0 or more and 1 and smaller (Hereinafter, this aromatic polyester is referred to as "Polyester I".). Specifically, an aromatic polyester in which (2)1/(3) is 5.00 and (4)/(5) is 0.31 Is disclosed(JP-A-60-38425).

Besides this, as aromatic polyesters having more improved molding property than Polyester I, those in which the ratio of (4)/(5) is 1.04 or more and 19 or smaller, and (2)/(3) is 0.1 or more and 2.67 and smaller has been proposed (Hereinafter, this aromatic polyester is referred to as "Polyester II".). Specifically, an aromatic polyester in which (2)/(3) is 1.00 and (4)/(5) is 2.33 is disclosed(JP-A-63-57633).

In recent years, since aromatic polyesters are used for electric and electronic components, those which give molded articles having excellent solder temperature resistance and rigidity(flexural elastic modulus) are demanded. However, there are problems that molded articles made from Polyester I exhibit low solder temperature resistance, and Polyester II exhibit low rigidity.

SUMMARY OF THE INVENTION

Under such circumstances, the present inventors have intensively studied to find an aromatic polyester containing unit (2) more than unit (3) and giving molded articles having excellent solder temperature resistance and rigidity. As the results, they have found that an aromatic polyester having a specific composition of (1), (2), (3), (4) and (5) not only has good molding property, but also gives a molded articles having remarkably excellent solder temperature resistance and rigidity. The present invention has thus been completed.

The present invention provides an aromatic polyester having the following structural units, (1), (2), (3), (4) and (5), wherein the amount of the structural unit (1) is 30 to 50based on the total of the all structural units, (2)/(3) Is more than 2.78 and smaller than 4, (4)/(5) is more than 1.0 and smaller than 1.5, and {(2)+(3)}/{(4)+(5)} is from 0.9 to 1.1:

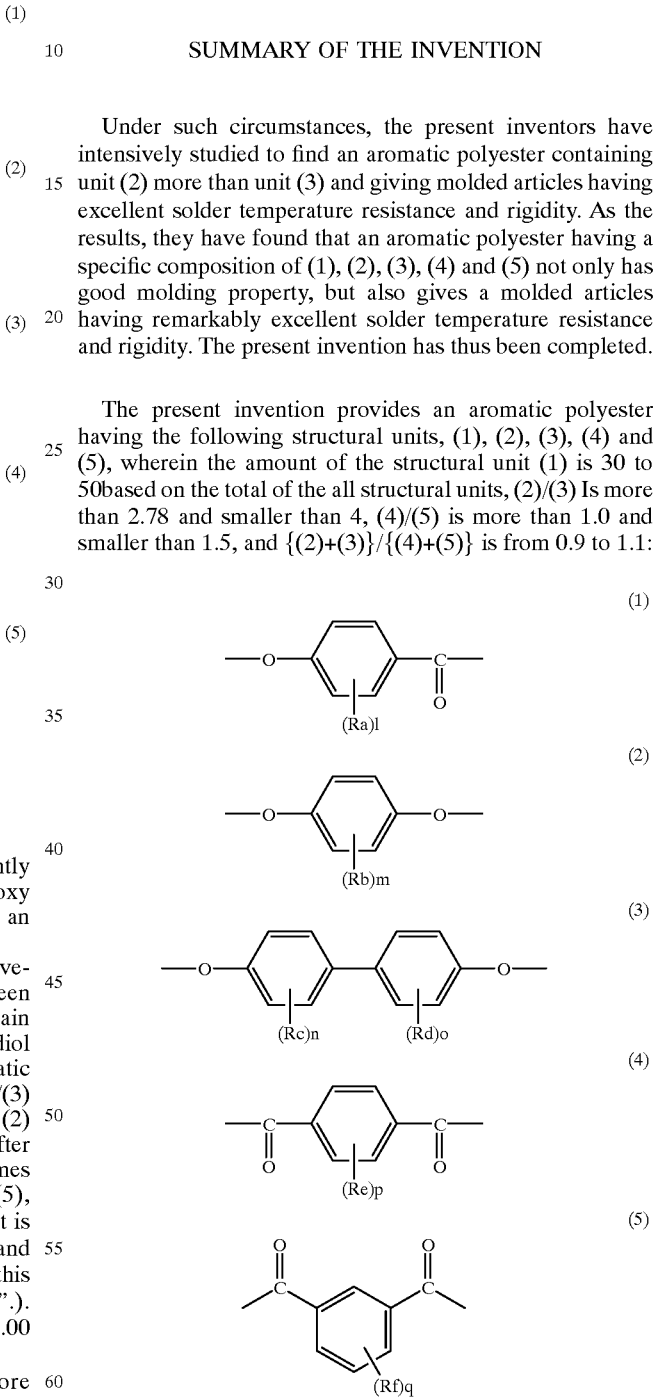

wherein Ra, Rb, Rc, Rd, Re and Rf each independently represents a lower alkyl group, lower alkoxy group, phenoxy group, phenyl group or halogen atom, and l, m, o, p and q each independently represents an integer from 0 to 3.

PREFERRED EMBODIMENT OF THE INVENTION

In the aromatic polyester of the present invention, the structural unit (1) is usually derived from p-hydroxybenzoic acids represented by the following general formula (6):

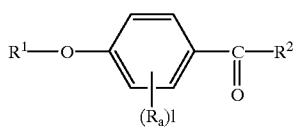

(6)

wherein, each Ra independently represents a lower alkyl group, lower alkoxy group, phenoxy group, phenyl group or halogen atom; l represents an integer from 0 to 3; $R^1$ represents a hydrogen atom or lower acyl group; and $R^2$ represents a hydroxyl group, lower alkoxy group, phenoxy group or halogen atom.

Examples of the lower alkyl group include a methyl group, ethyl group and propyl group. Examples of the lower alkoxy group include a methoxy group, ethoxy group and t-butoxy group. Examples of the halogen atom include chlorine and bromine. l represents an integer from 0 to 3, and an unsubstituted group in which l is 0 is preferable Examples of the lower acyl group include an acetyl group, propionyl group and benzoyl group.

Typical examples of the p-hydroxybenzoic acids include p-hydroxybenzoic acid, methyl p-hydroxybenzoate, ethyl p-hydroxybenzoate, p-acetoxybenzoic acid, methyl p-acetoxybenzoate, ethyl p-acetoxybenzoate, propyl p-hydroxybenzoate, phenyl p-hydroxybenzoate and benzyl p-hydroxybenzoate. Among other, p-hydroxybenzoic acid and p-acetoxybenzoic acrid are preferred.

The structural unit (2) is usually derived from hydroquinones represented by the following general formula (7):

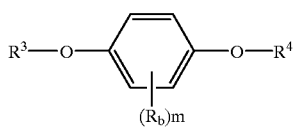

(7)

wherein each Rb independently represents a lower alkyl group, lower alkoxy group, phenoxy group, phenyl group or halogen atom; m represents an integer from 0 to 3; and $R^3$ and $R^4$ each independently represents a hydrogen atom or lower acyl group. Typical examples of the hydroquinones include hydroquinone and 1,4-diacetoxybenzene.

The structural unit (3) is usually derived from 4,4'-dihydroxybiphenyls represented by the following general formula (8):

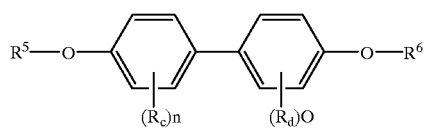

(8)

wherein Rc and Rd each independently represents a lower alkyl group, lower alkoxy group, phenoxy group, phenyl group or halogen atom: n and each:independently represents an integer from 0 to 3: and $R^5$ and $R^6$ each independently represents a hydrogen atom or lower acyl group.

Examples of the 4,4'-dihydroxybiphenyls include 4,4'-dihydroxybiphenyl and 4,4'-diacetoxybiphenyl.

The structural unit (4) is usually derived from terephthalic acids represented by the following general formula (9);

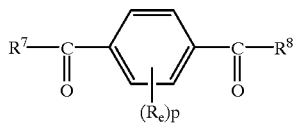

(9)

wherein each Re independently represents a lower alkyl group, lower alkoxy group, phenoxy group, phenyl group or halogen atom; p represents an integer from 0 to 3; and $R^7$ and $R^8$ each independently represents a hydroxyl group, lower alkoxy group, phenoxy group or halogen atom.

Typical examples of the terephthalic acids include terephthalic acid and dimethyl terephthalate.

The structural unit (5) is usually derived from isophthalic acids represented by the following general formula (10):

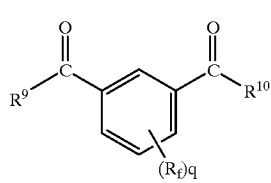

(10)

wherein, each Rf independently a lower alkyl group, lower alkoxy group, phenoxy group, phenyl group or halogen atom; q represents an integer from 0 to 3; and $R^9$ and $R^{10}$ each is independently represents a hydroxyl group, lower alkoxy group, phenoxy group or halogen atom.

Typical examples of the isophthalic acids include isophthalic acid and dimethyl isophthalate.

In the aromatic polyester of the present invention, the content of the structural unit (1) Is usually from about 30 to 50%, preferably from about 35 to 50% based on the total of the all structural units. In this specification, "%" indicating the content of a structural unit is molar basils, that is, based on the number of the structural unit, not based on the weight of the structural unit, unless otherwise mentioned.

When the content of the structural unit (1) is less than 30%, molding property of the aromatic polyester tends to deteriorate, or rigidity and heat resistance of the molded article made from the polyester tends to drop. When the content of the structural unit (1) exceeds 50%, molding property and solder temperature resistance of the aromatic polyester tends to deteriorate.

In the aromatic polyester of the present invention, (2)/(3) is more than 2.78 and smaller than 4.

When (2)/(3) exceeds the upper limit of the above range, solder temperature resistance of the molded article made from the aromatic polyester tends to drop. When it is not more than 2.78, rigidity of the molded article tends to drop.

In the aromatic polyester of the present invention, (4)/(5) is more than 1.0 and smaller than 1.5.

When (4)/(5) is less than 1.0, rigidity of the molded article made from the aromatic polyester tends to drop. When it is not smaller than 1.5, molding property and solder temperature resistance of the aromatic polyester tends to deteriorate.

In the present invention, {(2)+(3)}/{(4)+(5)} is about 0.9 to 1.1.

The method for producing the aromatic polyester of the present invention is not particularly restricted. As an example of the method, Japanese Patent Publication No. 2838119 discloses a method in which a polycondensate of compounds represented by the formulae (6), (7), (8), (9) and (10) is taken out in a melted condition, then, is subjected to a solid phase polymerization. More specifically, a method is exemplified in which a compound having a hydroxyl group is acylated with an acylating agent such as acetic anhydride and the like, then polycondensed together with a carboxylic compound while distilling oft the unreacted acylating agent, by-produced acids and the like; and, thereafter, the resulting slightly-polycondensed compound is recovered in a melted condition, cooled to solidify, pulverized, and then subjected to a solid phase polymerization under reduced pressure or in an inert gas atmosphere at usually from about 230 to 370° C.

In the polycondensation of the compounds represented by the formulae (6), (7), (8), (9) and (10), (6)/[(6)+(7)+(8)+(9)+(10)] is preferably from about 30 to 50%; (7)/(8) is more than 2.78 and smaller than 4; (9)/(10) is more than 1.0 and smaller than 1.5; and {(7)+(8)}/{(9)+(10)} is about 0.9 to 14, wherein (6), (7), (8), (9) and (10) represent molar amounts of the compounds of formulae (6), (7), (8), (9) and (10), respectively.

A catalyst may be used for accelerate the above-described polycondensation reaction. As the catalyst, metal oxides and organometal salts are exemplified. Specific examples thereof include oxides, acetates and oxalates of germanium, tin, titanium, antimony, cobalt and manganese.

The flow initiation temperature of the aromatic polyester in the present invention is usually from about 250 to 400° C., preferably from about 270 to 370° C.

The flow initiation temperature herein referred to is a temperature at which the melt viscosity is 48000 poise (4800Pa·s) using a capillary typerheometer equipped with a dice having an internal diameter of 1 mm and a length of 10 mm and the aromatic polyester being extruded through a nozzle at a temperature raising speed of 4° C./minutes under a load of 100 kg/cm$^2$(9.807MPa).

A molded article of the present invention is obtained by compounding the above-described aromatic polyester with inorganic fillers and the like, if necessary, and molding the mixture.

Examples of the inorganic fillers include glass fiber such as milled glass fiber and chopped glass fiber; inorganic fillers such as a glass bead, hollow glass sphere, glass powder, mica, talc, clay, silica, alumina, potassium titanate, wollastonite, calcium carbonate including heavy, light, colloidal and the like, magnesium carbonate, basic magnesium carbonate, sodium sulfate, calcium sulfate, barium sulfate, calcium sulfite, aluminum hydroxide, magnesium hydroxide, calcium hydroxide, calcium silicate, silica sand, silica stone, quartz, titanium oxide, zinc oxide, iron oxide graphite, molybdenum, asbestos, silica alumina fiber, alumina fiber, gypsum fiber, carbon fiber, carbon black, white carbon, diatomaceous earth, bentonite, cellite, shirasu and graphite; and metal or non-metal whiskers such as potassium titanate whisker, alumina whisker, aluminum borate whisker, silicon carbide whisker and silicon nitride whisker. Among them, glass fiber, glass powder, mica, talc, carbon fiber and the like are preferable.

Two or more kinds of above-described inorganic fillers may be combined and compounded into the molded article of the present invention. The amount of the inorganic filler to be compounded into the molded article is usually from about 0 to 400 parts by weight based on 100 parts by weight of the aromatic polyester.

Inorganic fillers subjected to a surface treatment may also be used. Examples of the surface treatment method include a method in which a surface treatment agent is adsorbed on the surface of an inorganic filler, and a method is in which a surface treatment agent is added in kneading an aromatic polyester with an inorganic filler.

Examples of the surface treatment agent include reactive coupling agents such as silane-based coupling agents, titanate-based coupling agents and borane-based coupling agents, and lubricants such as higher fatty acids, higher fatty esters, higher fatty metal salts and fluorocarbon-based surfactants.

The molded article of the present invention may also contain additives, thermoplastic resins and the like. Examples of the additive include releasing improving agents such as fluorine resins and metal soaps, nucleating agents, antioxidants, stabilizers, plasticizers, lubricants, coloring inhibitors, coloring agents, ultraviolet ray absorbers, antistatic agents and flame retardants.

Examples of the thermoplastic resin include polycarbonate resin, polyamide resins, polysulfone resins, polyphenylene sulfide resins, polyphenylene ether resins, polyether ketone resins and polyether imide resins.

As the method for producing a molded article, following methods (a), (b), (c) and (d) are exemplified.

(a) Raw materials such as an aromatic polyester, an inorganic filler, an additive etc. are put into a kneader such as a single screw extruder, twin screw extruder, banbury mixer, roll, brabender, kneaderand the like, then, melt-kneaded. The melt-kneaded product is fed into a molding machine such as an extrusion molding machine, injection molding machine, compression molding machine and blow molding machine to conduct molding.

(b) Raw materials are pre-mixed using a mortar, henschell mixer, ball mill, ribbon blender and the like. Then, melt-kneading and molding are conducted as in (a).

(c) Raw materials are added into a reaction vessel and mixed.

(d) Raw materials are fed into a molding machine, and molded while mixing in melted condition.

The molded article of the present invention can be molded into various forms including fiber, film or the like.

Due to its excellent molding property, mechanical property, electrical property, chemical resistance, heat resistance and oil resistance, it can be applied to mechanical parts such as gears, bearings and motor parts, electric and electronic parts such as switches, coil bobbins, relays, connector and sockets, business and information appliance parts such as printers, copying machines, facsimiles, video decks, video cameras, floppy disk drives, hard disk drives, CD-ROM drives and photomagnetic disk drives, semiconductor production process-related parts such as IC trays and wafer carriers, cooking appliances such as microwave cocking pans and heat resistant table wares for oven, large scale molder articles and molded articles having complicated forms, and the like The molded article of the present invention can be molded into films or sheets and can be used as parts for displays, electric insulation films, films for flexible circuit board, wrapping films, films for recording medium, and the like.

Moreover, the molded articles molded in the form of fibers such as continuous fibers, short fibers and pulp can be used as clothes, heat resistant insulation material, reinforcing materials for FRP, rubber reinforcing materials, ropes, cables, non-woven cloth and the like.

The following examples further illustrate the present invention in more detail, but do not limit the scope of the invention. "Parts" in the examples and comparative examples is weight basis unless otherwise mentioned.

EXAMPLE 1

Production of an Aromatic Polyester

Into a vessel equipped with a reflux condenser, thermometer, nitrogen-introducing tube and stirring rod were charged 525 parts (38% by mole) of p-hydroxybenzoic acid, 273 parts (24.8% by mole) of hydroquinone. 116 parts (6.20% by mole) of 4,4'-dihydroxybiphenyl, 281 parts (16.91% by mole) of terephthalic acid, 234 parts (14.09% by mole) of isophthalic acid and 1123 parts (110% by mole) of acetic anhydride. Then, the mixture was heated to about 140° C., and stirred for 3 hours under reflux condition. Thereafter, the acetic acid was distilled off while heating up to about 320° C., and the mixture was further kept at about 320° C. for 1 hour to obtain 1246 parts of a prepolymer.

The resulted prepolymer was cooled, then, ground by a grinder. Subsequently, it was put In a hot air circulation type oven, and the gas phase temperature in the oven was raised to 250° C. under nitrogen atmosphere. Further, the gas phase temperature was raised from 250° C. to 280° C. over 5 hours, then, kept at 280° C. for 3 hours to obtain 1240 parts of a polyester having a flow initiation temperature of 315° C.

Production of Molded Article

600 Parts of the aromatic polyester obtained above and 400 parts of chopped glass fiber (manufactured by Asahi FiberGlass K. K., CS03JAPx-1) were mixed by a henshell mixer, and granulated using a twin screw extruder (manufactured by Ikegai Corp., type PCM-30) at a cylinder temperature of 340° C. to obtain pellet.

The above-described pellet was dried at 120° C. for 3 hours, then, injection-molded using an injection molding machine (manufactured by Nissei Plastic Industrial Co., Ltd. PS40E5ASE) at a cylinder temperature of 340° C. and a mold temperature of 130° C. to obtain a test piece of 12.7 mm×6.4×mm×127 mm.

EXAMPLE 2–4 AND COMPARATIVE EXAMPLES 1–11

The same procedure, Production of an aromatic polyester and Production of molded article, was conducted as in Example 1 except that the composition of (1) to (5) (% by mole), (2)/(3) and (4)/(5) were changed as shown in Table 1.

In Table 1, each compound used is indicated by name is of the structural unit, that is, (1), (2), (3), (4) or (5), derived from the compound, as shown below.

(1) p-Hydroxybenzoic acid
(2) Hydroquinone
(3) 4,4'dihydroxybiphenyl
(4) Terephthalic acid
(5) Isophthalic acid Physical properties of the molded articles obtained in Examples 1–4 and Comparative examples 1–5 are shown in Table 1.

Measuring Method

Physical properties shown in Table 1 were measured according to the following methods.

Plexural Elastic Modulus

Using the test piece of 12.7 mm×6.4 mm×127 mm obtained in Examples and Comparative examples as above, Flexural elastic modulus was measured according to ASTM D790.

Solder Resistant Temperature

According to the similar manner to the above method for obtaining a test peace in Example or Comparative example, dumbbell shape test pieces were obtained (JIS K7113 (1/2)). Each test piece was dipped in a soldering bath kept at a temperature of one of every 5° C. from 270° C. to 300° C. for 60 seconds. Solder resistant temperature is the highest temperature at which no distortion of the test piece or blister (swelling by the inner generated gas.) was observed.

TABLE 1

(1)

| | Examples | | | |
|---|---|---|---|---|
| | 1 | 2 | 3 | 4 |
| Composition % by mole | | | | |
| (1) | 38.00 | 40.00 | 40.00 | 40.00 |
| (2) | 25.60 | 23.08 | 22.22 | 23.08 |
| (3) | 6.40 | 6.92 | 7.78 | 6.92 |
| (4) | 16.36 | 16.36 | 16.36 | 17.50 |
| (5) | 13.64 | 13.64 | 13.64 | 12.50 |
| Ratio by mole | | | | |
| (2)/(3) | 4.00 | 3.34 | 2.86 | 3.34 |
| (4)/(5) | 1.20 | 1.20 | 1.20 | 1.40 |
| Molding property | good | good | good | good |
| Flexural elastic modulus (Mpa) | 16500 | 15400 | 14800 | 16000 |
| Solder resistant temperature (° C.) | 295 | 295 | 290 | 295 |

(2)

| | Comparative examples | | | | |
|---|---|---|---|---|---|
| | 1 | 2 | 3 | 4 | 5 |
| Composition % by mole | | | | | |
| (1) | 56.00 | 45.00 | 60.00 | 56.00 | 56.00 |
| (2) | 15.17 | 22.90 | 16.70 | 11.00 | 13.00 |
| (3) | 6.83 | 4.60 | 3.30 | 11.00 | 9.00 |
| (4) | 13.00 | 13.00 | 3.30 | 15.50 | 12.00 |
| (5) | 9.00 | 14.50 | 16.70 | 6.50 | 10.00 |
| Ratio by mole | | | | | |
| (2)/(3) | 2.22 | 4.98 | 5.06 | 1.00 | 1.44 |
| (4)/(5) | 1.44 | 0.90 | 0.20 | 2.38 | 1.20 |
| Molding property | not good | good | good | good | good |
| Flexural elastic modulus (Mpa) | — | 12400 | 18400 | 13400 | 12400 |
| Solder resistant temperature (° C.) | — | <230 | <230 | 310 | 295 |

(3)

| | Comparative examples | | | | | |
|---|---|---|---|---|---|---|
| | 6 | 7 | 8 | 9 | 10 | 11 |
| Composition % by mole | | | | | | |
| (1) | 25 | 55 | 40 | 40 | 40 | 40 |
| (2) | 28.85 | 17.31 | 25 | 21.43 | 23.08 | 23.08 |
| (3) | 8.65 | 5.19 | 5 | 8.57 | 6.92 | 6.92 |
| (4) | 20.45 | 12.27 | 16.36 | 16.36 | 18.5 | 12.35 |
| (5) | 17.05 | 10.23 | 13.64 | 13.65 | 11.5 | 17.65 |

TABLE 1-continued

| Ratio % by mole | | | | | | |
|---|---|---|---|---|---|---|
| (2)/(3) | 3.34 | 3.34 | 5.00 | 2.50 | 3.34 | 3.34 |
| (4)/(5) | 1.20 | 1.20 | 1.20 | 1.20 | 1.61 | 0.70 |
| Molding property | good | good | good | good | not good | good |
| Flexural elastic modulus (Mpa) | 12200 | 17600 | 17300 | 13500 | — | 12800 |
| Solder resistant temperature (° C.) | 290 | <230 | 230 | 295 | — | 270 |

The aromatic polyester of the present invention has excellent molding property. Further, a molded article made from this polyester has excellent soldering temperature resistance and rigidity. Therefore, it can be applied to large scale molded articles, electric and electronic parts, precision instruments, and the like.

What is claimed is:

1. An aromatic polyester having the following structural units, (1), (2), (3), (4) and (5), wherein the amount of the structural unit (1) is 30 to 50% based on the total of the all structural units, (2)/(3) is more than 2.78 and smaller than 4, (4)/(5) is more than 1.0 and smaller than 1.5, and {(2)+(3)}/{(4)+(5)} is from 0.9 to 1.1:

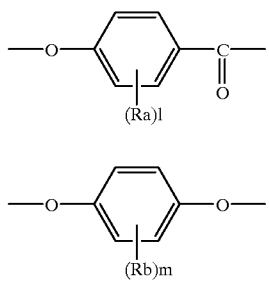

(1)

(2)

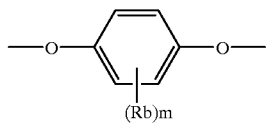

(3)

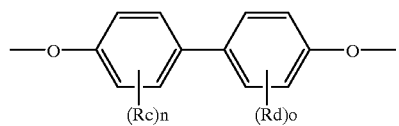

(4)

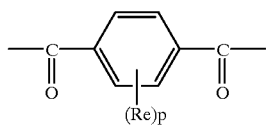

(5)

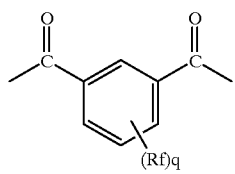

wherein Ra, Rb, Rc, Rd, Re and Rf each independently represents a lower alkyl group, lower alkoxy group, phenoxy group, phenyl group or halogen atom, and l, m, n, o, p and q each independently represents an integer from 0 to 3.

2. The aromatic polyester according to claim 1 wherein the structural units (1), (2), (3), (4) and (5) are derived, respectively, from compounds represented by the following structure (6), (7), (8), (9) and (10):

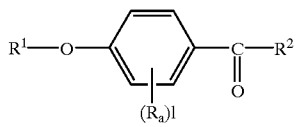

(6)

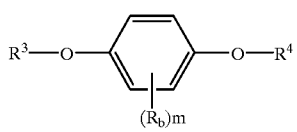

(7)

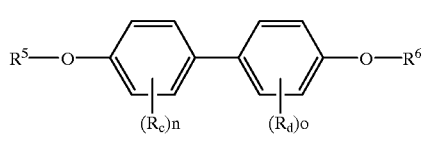

(8)

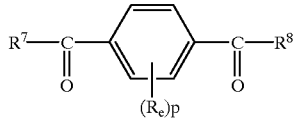

(9)

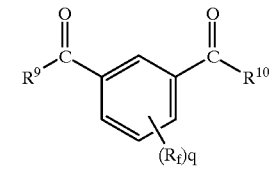

(10)

wherein Ra, Rb, Rc, Rd, Re, Rf, l, m, n, o, p and q are the same as defined in claim 1; $R^1$, $R^3$, $R^4$, $R^5$ and $R^6$ represents a hydrogen atom or a lower acyl group; and $R^2$, $R^7$, $R^8$, $R^9$ and $R^{10}$ represents a hydroxyl group, a lower alkoxy group, phenoxy group or a halogen atom.

3. The aromatic polyester according to claim 2 wherein l, m, n, o, p and q are 0; each $R^1$, $R^3$, $R^4$, $R^5$ and $R^6$ is a hydrogen atom or an acetyl group; and each $R^2$, $R^7$, $R^8$, $R^9$ and $R^{10}$ is a hydroxyl group.

4. A method for producing an aromatic polyester according to claim 2, which comprises a polycondensation of the compounds represented by the formulae (6), (7), (8), (9) and (10) wherein (6)/[(6)+(7)+(8)+(9)+(10)] is from about 30 to 50%; (7)/(8) is more than 2.78 and smaller than 4; (9)/(10) is more than 1.0 and smaller than 1.5; and {(7)+(8)}/{(9)+(10)} is about 0.9 to 1.1, wherein (6), (7), (8), (9) and (10) represent molar amounts of the compounds of formulae (6), (7), (8), (9) and (10), respectively.

5. A molded article obtained by compounding 100 parts by weight of the aromatic polyester according to claim 1 and about 0 to 400 parts by weight of an inorganic filler.

* * * * *